(12) United States Patent
Zhang et al.

(10) Patent No.: US 8,139,769 B2
(45) Date of Patent: Mar. 20, 2012

(54) PROCESSING MULTI-KEY CONTENT

(75) Inventors: Jian Zhang, Shanghai (CN); Ling Shao, Beijing (CN); Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 12/418,938

(22) Filed: Apr. 6, 2009

(65) Prior Publication Data

US 2009/0190763 A1    Jul. 30, 2009

Related U.S. Application Data

(62) Division of application No. 11/082,714, filed on Mar. 17, 2005, now Pat. No. 7,516,332.

(30) Foreign Application Priority Data

Mar. 22, 2004   (CN) .......................... 2004 1 0031511

(51) Int. Cl.
*H04L 9/00* (2006.01)
(52) U.S. Cl. .......................................... 380/277; 380/44
(58) Field of Classification Search .................. 380/277, 380/278, 44; 705/57; 713/189, 190, 193
See application file for complete search history.

(56) References Cited

U.S. PATENT DOCUMENTS

| | | | |
|---|---|---|---|
| 6,460,023 B1 * | 10/2002 | Bean et al. ....................... | 705/54 |
| 6,865,431 B1 * | 3/2005 | Hirota et al. .................... | 700/94 |
| 7,224,805 B2 * | 5/2007 | Hurst et al. .................... | 380/285 |
| 7,466,826 B2 * | 12/2008 | Andreaux et al. ............ | 380/277 |
| 2002/0076204 A1 | 6/2002 | Nakano et al. | |
| 2002/0108036 A1 | 8/2002 | Okaue | |
| 2002/0108055 A1 | 8/2002 | Okaue | |
| 2002/0114466 A1 | 8/2002 | Tanaka et al. | |
| 2002/0116622 A1 | 8/2002 | Okaue et al. | |
| 2003/0016826 A1 | 1/2003 | Asano et al. | |
| 2003/0076958 A1 | 4/2003 | Ishiguro et al. | |
| 2005/0044046 A1 * | 2/2005 | Ishiguro .......................... | 705/57 |
| 2005/0201559 A1 * | 9/2005 | Van Der Heijden .......... | 380/239 |

FOREIGN PATENT DOCUMENTS

WO    WO 0247356 A2 *   6/2002

\* cited by examiner

*Primary Examiner* — Samson Lemma
(74) *Attorney, Agent, or Firm* — Michael J. Buchenhorner; Vazken Alexanian (57) ABSTRACT

Multi-key content processing systems and methods, for processing content with at least one distribution target position. Each of the distribution target positions corresponds to an authorization key. An example method includes the steps of: encrypting said content with a content key; forming a key link based on said content key and the authorization key of said at least one distribution target position; and attaching said key link to the encrypted content.

3 Claims, 5 Drawing Sheets

| AK_IDn | Mapping from AKn to CK |
|---|---|
| ⋮ | ⋮ |
| AK_ID2 | Mapping from AK2 to CK |
| AK_ID1 | Mapping from AK1 to CK |
| Content + CK ||

PROCESSING MULTI-KEY CONTENT

CROSS-REFERENCE TO RELATED APPLICATIONS

This application is a divisional of, and claims priority from, commonly-owned, U.S. patent application Ser. No. 11/082,714, field on Mar. 17, 2005 now U.S. Pat. No. 7,516,332, which is incorporated herein by reference in its entirety.

STATEMENT REGARDING FEDERALLY SPONSORED RESEARCH OR DEVELOPMENT

None.

INCORPORATION BY REFERENCE OF MATERIAL SUBMITTED ON A COMPACT DISC

None.

FIELD OF THE INVENTION

This invention relates generally to systems and methods for processing digital contents. More particularly, this invention relates to systems and methods for efficient management of digital content with multiple keys.

BACKGROUND OF THE RELATED ART

With the digitization of information, it is possible to obtain, in the digital form, information of various types such as video, audio and data. For the purpose of copyright protection, however, a corresponding key is needed when people are trying to attain such information from certain media (for example, Internet, or physical storage media such as optical or magnetic disks). Such a process is known in the art as "Digital Right Management" (DRM). In DRM, said information is called digital content or digital asset, and each of said digital content is protected by a content key CK.

A hierarchical content key management system is proposed in Chinese Application No. 03123222.1, filed on Apr. 22, 2003, the entirety of which is incorporated herein for reference. In this hierarchical content key management system, it is assumed that each content should have a unique position in the key tree, and this unique position corresponds to an authorization key AK. In other words, each content should have a content name (or content path) that can uniquely identify the position of this content in the hierarchical key tree. Said system functions well in cases where one content corresponds to one position (i.e., where one content has only one authorization key AK).

When the system is put into practical use, however, it is realized that one content is often to be placed at a plurality of positions. For example, the film Star War II might be in the path "Star War Series.backslash. Star War II", or it might be in the path "Movies.backslash.US.backslash.2002.backslash.Star War II". In this case, for the afore-mentioned hierarchical content key management system, on one hand, the position determines the authorization key, then one content will have two different keys, on the other hand, it is desired that possession of either key will suffice for decryption of the content. Obviously, these two aspects are contradictory.

One simple way to solve this problem of multi-path (or multi-name, multi-position) content is to make multiple different encrypted copies of the content, with each copy having an authorization key respectively. This, however, will consume massive amount of storage resources, and brings great difficulty for content management.

SUMMARY OF THE INVENTION

The present invention effectively solves the above problem for multi-path content. According to a first aspect of the invention, a method for processing digital content is provided, for processing content with at least one distribution target position, each of said at least one distribution target position corresponds to an authorization key (AK), the method comprises the steps of: encrypting the content with a content key (CK); forming a key link (KL) based on the content key and the authorization key of said at least one distribution target position; and attaching the key link to the encrypted content.

According to a second aspect of the invention, a system for processing digital content is provided, for processing content with at least one distribution target position, each of said at least one distribution target position corresponds to an authorization key (AK), the system comprises: an encrypting engine for encrypting the content with a content key (CK); a key link formation engine for forming a key link (KL) based on the content key and the authorization key of said at least one distribution target position; and an attaching engine for attaching the key link to the encrypted content.

According to a third aspect of the invention, a method for processing digital content for a distribution target position is provided, wherein the distribution target position corresponds to an authorization key (AK), and the content has a content key (CK) for encryption thereof and a key binding data (KBD), the key binding data comprises key links (KL) corresponding to at least one distribution target position, and the key link associates the content with said at least one distribution target position.

According to a forth aspect of the invention, a system for processing digital content for a distribution target position is provided, wherein the distribution target position corresponds to an authorization key (AK), and the content has a content key (CK) for encryption thereof and a key binding data (KBD).

BRIEF DESCRIPTION THE DRAWINGS

For a more complete understanding of the present invention and the advantages thereof, reference is now made to the following description taken in conjunction with the accompanying drawings. In the drawings.

DETAILED DESCRIPTION OF THE INVENTION

The present invention effectively solves the problem for multi-path content. According to the invention, a method for processing digital content is provided. The method is for processing content with at least one distribution target position. Each of the distribution target positions corresponds to an authorization key (AK). An example of a method comprises the steps of: encrypting the content with a content key (CK); forming a key link (KL) based on the content key and the authorization key of said at least one distribution target position; and attaching the key link to the encrypted content.

The invention also provides a system for processing digital content. A system is for processing content with at least one distribution target position. Each of the distribution target positions corresponds to an authorization key (AK). An example of a system comprises: an encrypting engine for encrypting the content with a content key (CK); a key link formation engine for forming a key link (KL) based on the content key and the authorization key of said at least one distribution target position; and an attaching engine means for attaching the key link to the encrypted content.

With the system and method of the present invention on the encryption side, the content is associated with its respective distribution target positions (or its respective authorization keys) both logically and computationally, so that the content is decryptable when the user owns any one of the authorization keys. Then, it is not necessary to make copies for each distribution target positions, and one copy of the content will suffice the needs of all distribution target positions. The invention also discloses the corresponding operations on the decryption end.

The invention also provides a method for processing digital content for a distribution target position. The distribution target position corresponds to an authorization key (AK), and the content has a content key (CK) for encryption thereof and a key binding data (KBD). A key binding data comprises key links (KL) corresponding to at least one distribution target position, and the key link associates the content with said at least one distribution target position. The method comprises the steps of: obtaining the content; matching the authorization key with the key links in the key binding data, to determine if the authorization key exists in any of the key links; and if the authorization key exists in one of the key links, calculating the content key with the authorization key for decryption of the content.

The invention also provides a system for processing digital content for a distribution target position. The distribution target position corresponds to an authorization key (AK), and the content has a content key (CK) for encryption thereof and a key binding data (KBD). The key binding data comprises key links (KL) corresponding to at least one distribution target position, and the key link associates the content with said at least one distribution target position. The system comprises: an acquisition engine for obtaining the content; an analysis engine for matching the authorization key with the key links in the key binding data, to determine if the authorization key exists in any of the key links; and a decryption engine for, if the authorization key exists in one of the key links, calculating the content key with the authorization key for decrypting the content.

The embodiments of the present invention will be described in detail below in connection with the figures.

It should be pointed out that although the description below will essentially focus on content distributed over the Internet, one skilled in the art will understand that this invention is not limited thereto. This invention aims at a solution for handling problems arising from "one content with multiple keys", and it is applicable for any occasions where this problem exists, irrespective of the distribution mode or distribution media of the content. Therefore, the invention is equally applicable to content that is accessed from physical storage media such as optical or magnetic disks.

Figure 1:
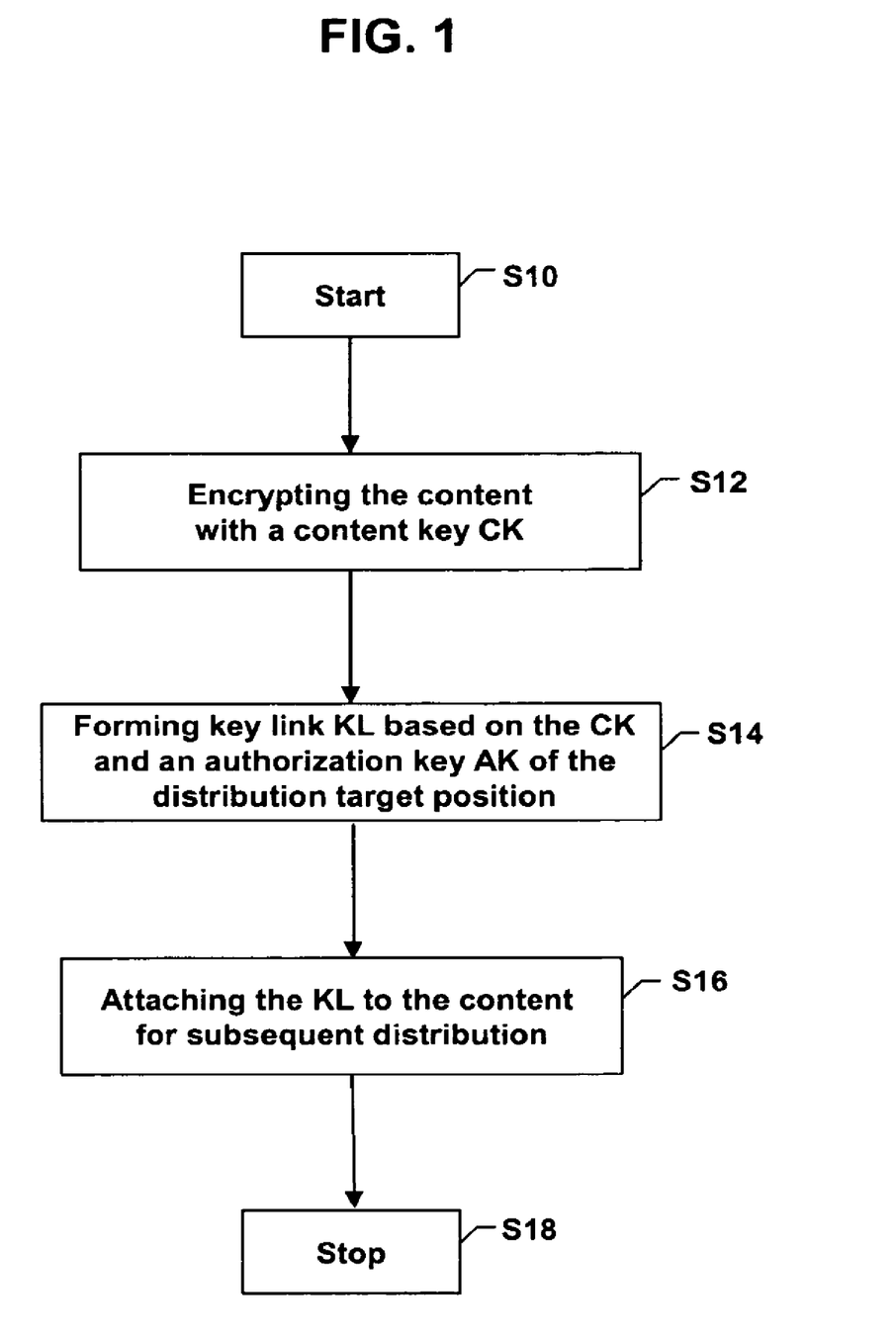
FIG. 1 shows an example of a flowchart of the method according the present invention at the content encryption side.

Referring now to FIG. 1, which is the overall flowchart of the method of the invention on the content encryption side.

The method starts from step S10, and then proceeds to step S12. In step S12, a content (for example, the movie "Star War II") is encrypted with a content key CK. Traditionally, after this encryption of the content, the encrypted content will be distributed to a distribution target position where this content is needed, for example, the path "Star War Series.backslash-.Star War II" on the Internet. According to this invention, however, a key link formation step S14 follows this encryption step, for forming a key link KL based on the content key CK and the authorization key AK of the distribution target position, so as to achieve uniform and compact management of the content. The key link formation step S14 will be detailed below.

As mentioned above, for the hierarchical content key management system of Chinese Application No. 03123222.1, one distribution target position has one corresponding authorization key AK, and the authorization key AK has a identifier AK_ID for identifying to which distribution target position the authorization key AK belongs. Typically, an AK_ID can be for example the URL of the distribution target position, or it can be other parameters capable of identifying the distribution target position (for example, for physical storage media, the identifier can be the file path). The AK and AK_ID constitutes the authorization key information of the distribution target position.

In the method of the invention, before the encrypted content is distributed to a distribution target position, a key link is first formed, the key link is used to associate the content with its distribution target position(s) (i.e., the AK(s) of the distribution target position(s)). When there are a plurality of the key links, the possession of any one of the correct authorization keys AK will be enough to calculate the content key CK, and thereby decrypt the content. A typical key link can comprise 1) the mapping between the authorization key AK of the at least one distribution target position and the content key CK, and 2) the identification of the distribution target position corresponding to the authorization key AK. For example, in one embodiment of the invention, a key link is formed by combining a parameter for mapping the authorization key AK of the distribution target position to the content key CK and the AK_ID of the authorization key.

The operation for forming the key link will be described below. The key link can be formed by combining the cipher text used for encrypting the content key CK with the authorization key AK and the authorization key identifier AK_ID. In this case, the parameter for mapping the authorization key AK of the distribution target position to the content key CK is the cipher text.

In addition, the key link can be formed by employing the following equation.

$$KL = AK\_ID + (MD(AK) \oplus CK) \qquad (1)$$

wherein, $\oplus$ means XOR (modulo-2 adding) calculation, $MD(x)$ means any hash algorithm (one-way algorithm). In this case, the parameter for mapping the authorization key AK of the distribution target position to the content key CK is a modified value $KL_{mod}$ of the one-way algorithm, i.e., the part after the plus sign (+) in equation (1). One skilled in the art will understand, for $KL_{mod}=$ (MD(AK){circumflex over ( )}CK), CK=MD(AK){circumflex over ( )}KL.sub.mod can be calculated, this is because the result of the one-way algorithm can not be equal to CK directly (since the result of the one-way algorithm is not predictable). As a result, a value, KL.sub.mod, needs to be XORed so as to calculate CK.

Further, the key link can be formed by simply XORing the AK and CK, and combining the modified value of the XOR operation and the authorization key identifier AK_ID.

The above are only examples for forming key links, and one skilled in the art will understand that this invention is not limited to this. In essence, as long as the conversion from AK to CK can be carried out and subsequently CK can be calculated on the decryption side, any AK-CK mapping parameter can be used, namely, the specific AK-CK mapping parameter used is not relevant to the implementation of the invention.

Alternatively, this invention is applicable to systems other than the hierarchical content key management system. Then, an authorization key is not necessarily so closely related to its AK_ID as in the hierarchical content key management system. In other words, an authorization key might not have the AK_ID used for identifying the distribution target position to which it belongs. Instead, the information regarding the position where the authorization key belongs can be attained easily. For example, the position information can be derived by numbering the authorization keys and then using the order of the numbering as the position information, or simply by try matching the authorization key with the respective distribution target position one by one. To this end, in this alternative embodiment, a key link can be generated without the identifier AK_ID of the authorization key AK.

Once the key link is formed in step S14, the method of the invention proceeds to step S16 where the key link is attached to the content, then the content is ready for distribution. The method of the invention terminates in step S18.

Figure 2:
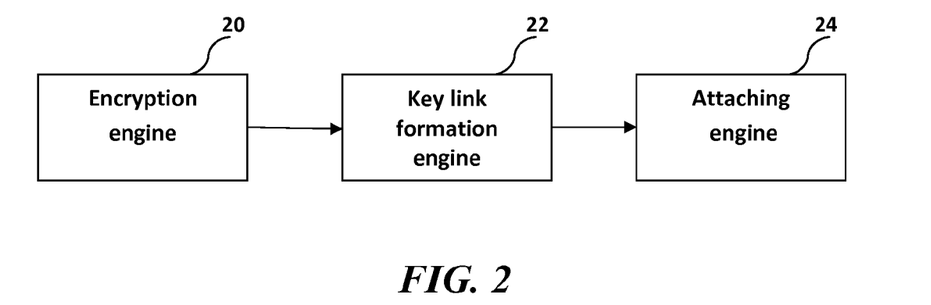
FIG. 2 shows an example of a block diagram of the system according the present invention at the content encryption side.

The present invention can be implemented in the system as shown by the block diagram of FIG. 2. The system comprises an encryption engine 20 for encrypting the content with a content key CK. The encrypted content is then fed to the key link formation engine 22 where a key link KL is formed by using the content key CK and the authorization key AK of the distribution target position of the content. Afterwards, in the attaching engine 24, the key link KL is attached to the content for use in the subsequent distribution. As one skilled in the art will understand, the system of the invention can be implemented in numerous ways, for example by using computer software routine, by using hardware separate elements, or by combining the software routine and the hardware elements.

As one skilled in the art will understand, one key link is needed when there is only one distribution target position. But as more distribution target positions manifest, key links will be formed for each of these distribution target positions, and then all the formed key links are combined to generate a key binding data KBD. Again, as one skilled in the art will understand, one KL can be regarded as a KBD (i.e., a KBD that binds one KL). In this way, a uniform and compact management of the multi-key content can be implemented, as will be elaborated below.

Hereinafter, a preferred embodiment of the present invention will be detailed with reference to FIG. 3, wherein one content is to be distributed to a plurality of distribution target positions, with each of the distribution target positions corresponding to an authorization key AK1.quadrature.AK2.quadrature . . . AKn, respectively.

Figure 3:
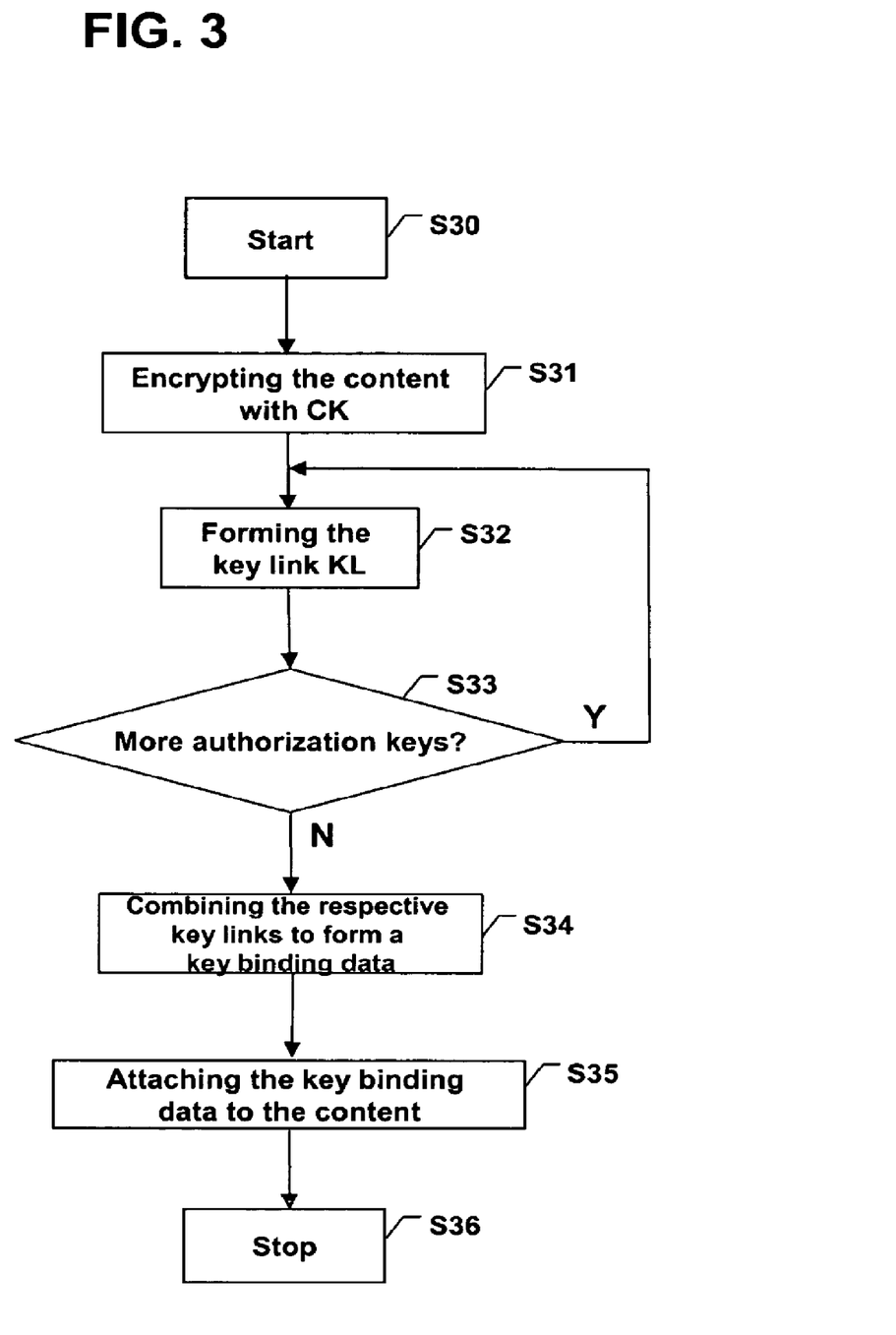
FIG. 3 shows an example of a flowchart of the preferred embodiments of the method according the present invention on the content encryption side.

As shown in FIG. 3, the method of the invention starts in step S30 and proceeds to step S31 where the content is encrypted with a content key CK.

Then in step S32, a key link KL1 is formed for the authorization key AK1 of the first distribution target position with any one of the approaches mentioned above.

Then the operation proceeds to step S33, where a determination engine (not shown) determines whether the content is to be placed on a second distribution target position. If so, i.e., the determination result of step S33 being "Yes", the operation loops back to step S32, and a key link KL2 is formed for the authorization key AK2 of the second distribution target position with any one of the approaches mentioned above.

Each time a key link is formed for a distribution target position, a determination is then made in step S33 to determine if there is further distribution target position. If the determination result is "Yes", the operation of step S32 will be repeated.

Otherwise, if the determination result of step S33 is "No", i.e., key links have been formed for all n distribution target positions, then the operation proceeds to step S34 where the key binding data KBD is formed by combining the respective key links, as shown in the following equation:

$$KBD=KL1+KL2+\ldots+KLn \quad (2)$$

Figure 4:
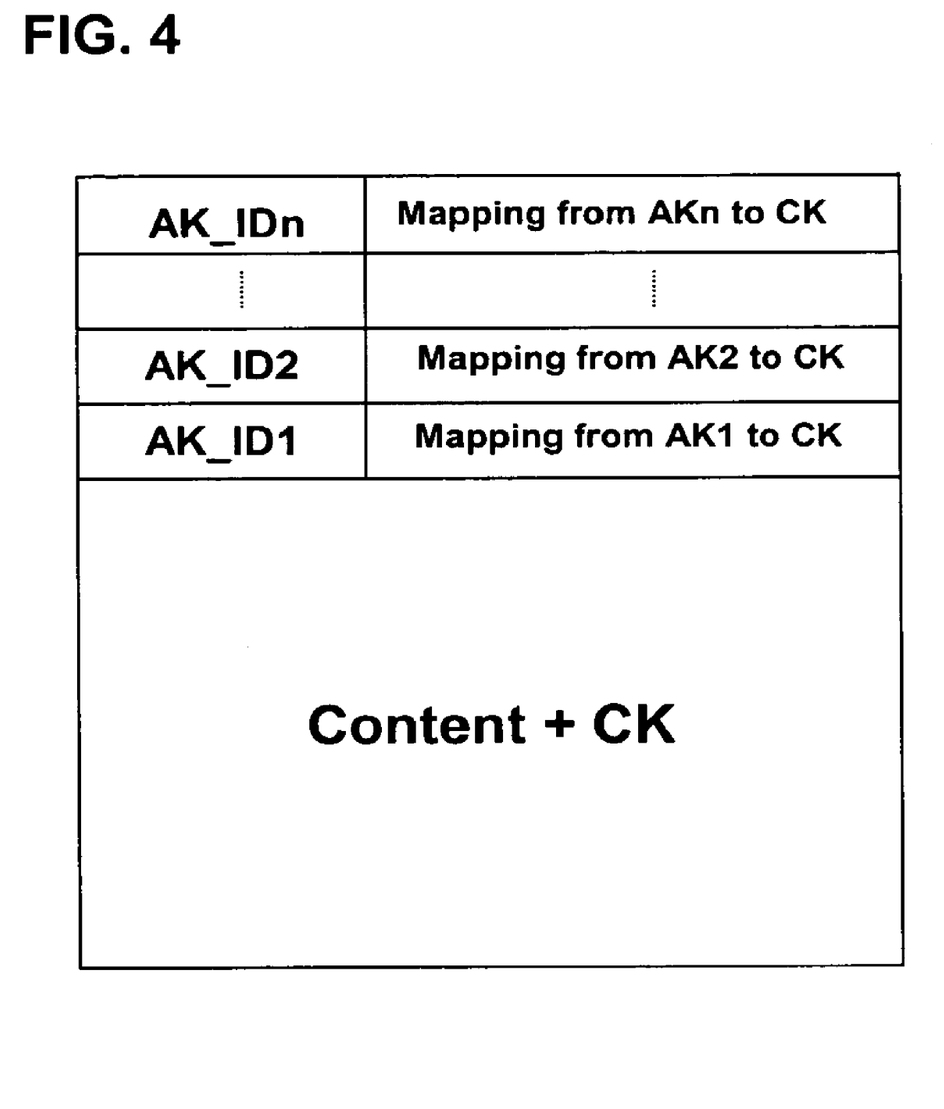
FIG. 4 shows an example of an illustrated structure of the content when the method according the present invention is employed.

In the method of the present invention, the KL or KBD should be bound with the content. For example, the KL or KBD can be the head of the content, or can be a separate index file of the content. FIG. 4 exemplified the KBD existing as the head the content.

Next, the operation flows to step S35 where the key binding data is attached to the content for subsequent distribution. The method of the invention stops in step S36.

For the method of FIG. 3, if there are only one or several distribution target positions initially, and others manifest subsequently, a key link or key binding data can first be generated for the one or several distribution target positions, and then as subsequent distribution target positions appear, newly formed key links are attached to the previously formed key link or key binding data to create new key binding data.

With the key binding proposed by this invention, the content can be associated with its respective distribution target positions, so that the content is decryptable so long as the user possesses any one of the correct authorization key, and thereby eliminating the need for physically storing copies of the content for each of the distribution target positions. This saves the storage space and facilitates the effective and uniform management of the content.

With the present invention, user with authorization key AK1 can decrypt KL1 with AK1 to obtain the content key CK to decrypt the content. Likewise, user with authorization keys AK2 or AK3 can also decrypt the content. In this scenario, in order to enhance the content management, right statements can be attached to the key links KL, as shown in the following equation:

$$1\{KL1=AK\_ID1+(MD(AK1)\char`\^CK)+RIGHTS\ 1$$
$$KL2=AK\_ID2+(MD(AK2)\char`\^CK)+RIGHTS\ 2$$
$$KL3=AK\_ID3+(MD(AK3)\char`\^CK)+RIGHTS\ 3 \quad (3)$$

By appending the above right statements, users with different AKs can have different rights. For example, user with AK1 can view and modify the content, user with AK2 can only view the content, while user with AK3 can view and print the content (provided that the content is a document). The various right statements can enhance the license management.

With the method proposed in Chinese Application No. 03123222.1, one node in the key management tree (the node corresponding to one authorization key) can cover the rights of all its children, i.e., as long as the user possesses the authorization key of the node, the user is entitled to access the contents in all its child nodes without the need to further obtaining the keys for each of the child nodes. This feature is also available in the current invention. Therefore, one of the critical points for this invention lies in post-binding. That is, the transfer of the authorization key AK can be earlier than the transfer or even the generation of the content, so that post-binding enables the content to be decryptable to users with different AKs when distributed.

Above is the detailed description of the operation on the content encryption side. Below, the corresponding operation on the content decryption side will be elaborated.

Figure 5:
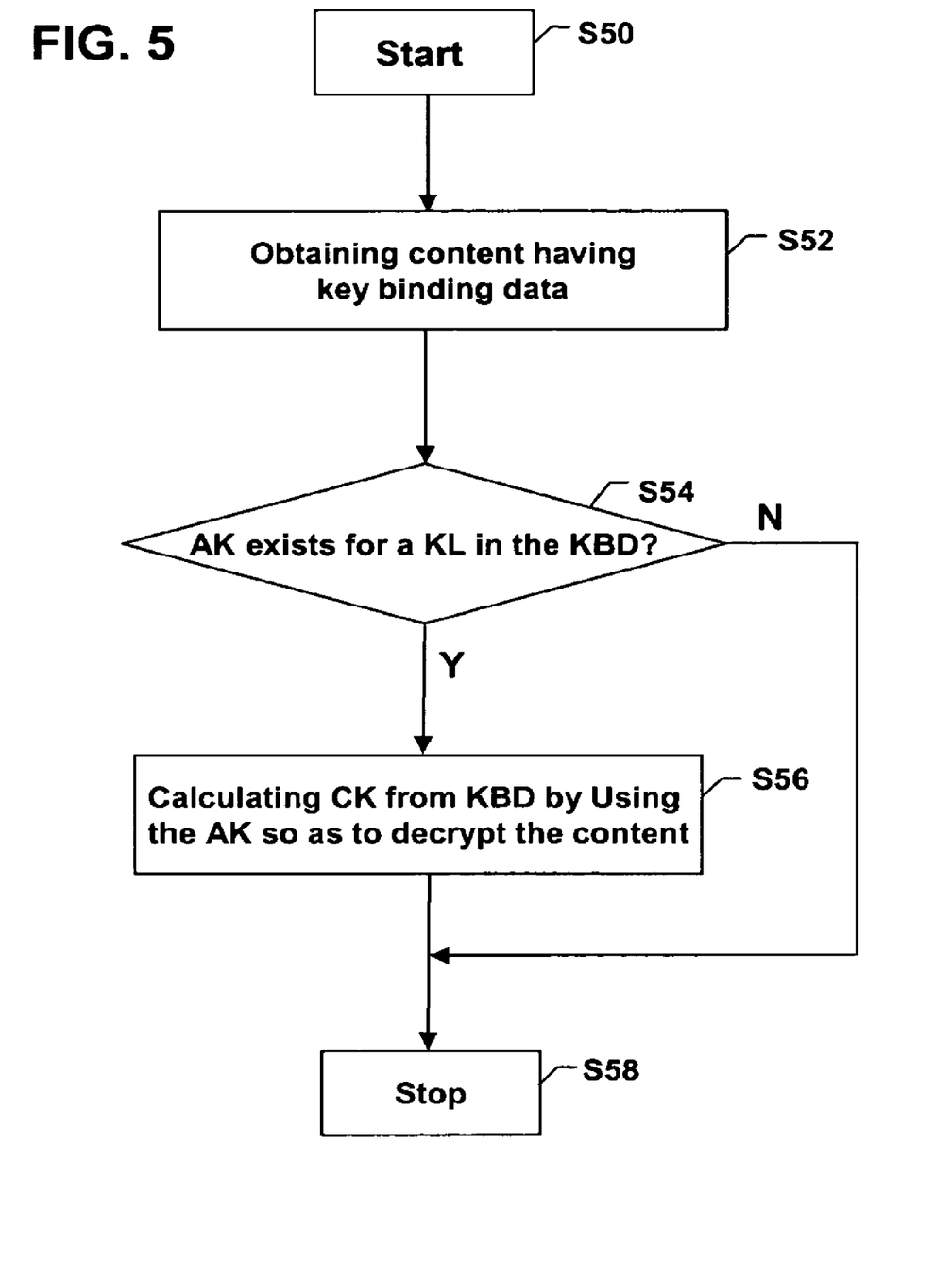
FIG. 5 shows an example of a flowchart of the method according the present invention on the content decryption side.

After the above-mentioned content with key binding data is distributed to a distribution target position having a corresponding AK, decryption is needed so that the user can access the content. FIG. 5 illustrates the overall flowchart of the operation on the decryption side.

The operation on the decryption side starts from step S50 and then proceeds to step S52. In step S52, a distribution target position obtains a distributed content, the content has the key binding data KBD as proposed by the invention. Next in step S54, the distribution target position determines whether its own authorization key is contained within the KBD by matching its own authorization key with each KL in the key binding data KBD.

It will be realized by one skilled in the art that the matching operation here is to try if the AK possessed by the decryption side can be used for a certain KL, and this process can be performed by any applicable approaches available.

If it is determined that the AK exists in the KBD (the result of step S54 being "Yes"), the operation proceeds to step S56, where the AK is used to obtain CK from the KBD to decrypt the content, as mentioned before. Then, the operation proceeds to step S58, and the method of the invention terminates. If it is determined that the AK does not exist in the KBD (the result of step S54 being "No"), the operation proceeds directly to step S58.

Figure 6:
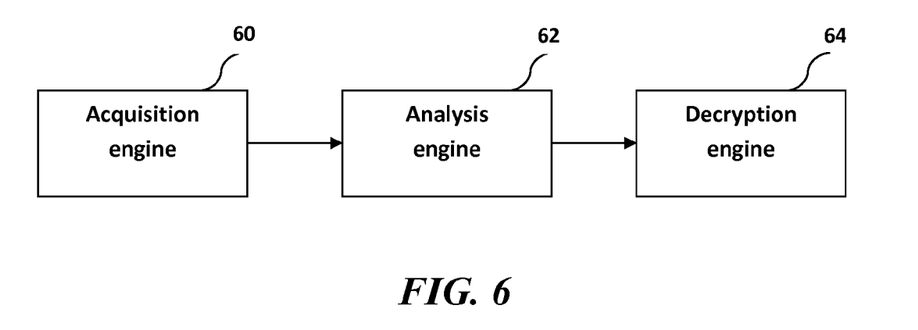
FIG. 6 shows an example of a flowchart of the system according the present invention on the content decryption side.

The decryption operation can be implemented by the system as shown in FIG. 6.

In the system of FIG. 6, an acquisition engine 60 located at a certain distribution target position is used for obtaining the distributed content, and the content contains the key binding data of the present invention. Afterwards, the obtained content was fed to an analysis engine 62 where the authorization key AK of this certain distribution target position is matched against the respective KLs in the key binding data KBD, so as to determine if the AK exists in the KBD. If the determination result of the analysis engine 62 is "Yes", a decryption engine 64 is notified of this result so that the AK is used to obtain CK from the key binding data so as to decrypt the content. If the determination result of the analysis engine 62 is "No", then no decryption is carried out. As one skilled in the art will understand, the system of the invention can be implemented in numerous ways, for example by using computer software routine, by using hardware separate element, or by combining the software routine and the hardware elements.

If different rights were set for different AK (i.e., different distribution target position), the analysis engine 62 will also deduce the rights of the distribution target position possesses, in order that the user can access the content with the appropriate rights.

In this invention when the content is to be distributed to a plurality of distribution target positions, the authorization keys of the respective distribution target positions is associated with the content key, so that the content and its positions are related both logically and computationally and thus eliminating the need for physically copying the content to each of the positions. With the present invention, uniform, compact, and convenient management of the content can be achieved.

The preferred embodiments of the present invention have been described in detail. However, one skilled in the art will realize that the preferred embodiments are only given for the purpose of illustration, and should not be construed as liming the preset invention thereto. This invention can be implemented by way of software, hardware or the combination of the two. One skilled in the art can make various modifications and variations to the present invention, however, these modifications and variations are all within the scope and spirit of the invention as defined in the accompanying claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A digital content processing method comprising steps of:
   at each of a plurality of distribution targets obtaining digital content from a storage device;
   wherein each distribution target in the plurality of distribution targets corresponds to an authorization key, said authorization key comprising an identifier identifying the distribution target to which said authorization key belongs;
   encrypting the digital content with a content key using an encryption device, forming encrypted digital content;
   attaching a key link to the encrypted digital content for distribution to each distribution target, said key link formed by a key link formation engine combining:
   a parameter for mapping the authorization key of the distribution target to the content key; and
   an identifier of the authorization key;
   wherein the key links for each of the plurality of distribution targets are combined to form key binding data bounded by the digital content;
   an acquisition engine obtaining the encrypted digital content;
   an analysis device performing:
   matching the authorization key of the distribution target to the identifier in the key link of the key binding data attached to the encrypted digital content; and
   obtaining the content key using the authorization key; and
   a decryption engine decrypting the encrypted digital content with the content key.

2. A digital content processing system comprising:
   at each of a plurality of distribution targets: an acquisition device obtaining encrypted digital content from a storage device;
   wherein each distribution target in the plurality of distribution targets corresponds to an authorization key, said authorization key comprising an identifier identifying the distribution target to which said authorization key belongs;
   wherein the digital content is encrypted with a content key by an encryption engine;
   wherein a key link is attached by a key link formation engine to the encrypted digital content for distribution to each distribution target, said key link formed by combining:
   a parameter for mapping the authorization key of the distribution target to the content key; and
   an identifier of the authorization key;
   wherein the key links for each of the plurality of distribution targets are combined to form key binding data bounded by the digital content; and
   an analysis device performing:
   matching its authorization key to the identifier in the key link of the key binding data attached to the encrypted digital content; and
   obtaining the content key using the authorization key; and
   a decryption engine decrypting the digital content with the content key.

3. An article of manufacture comprising a non-transitory computer readable medium having computer readable program instructions embodied therein for causing a computer to perform steps of:
   at each of a plurality of distribution targets obtaining digital content from a storage device:
   wherein each distribution target in the plurality of distribution targets corresponds to an authorization key, said authorization key comprising an identifier identifying the distribution target to which said authorization key belongs;
   wherein the digital content is encrypted with a content key by an encryption engine, forming encrypted digital content;
   wherein a key link is attached to the encrypted digital content for distribution to each distribution target, said key link formed by a key link formation engine combining:
   a parameter for mapping the authorization key of the distribution target to the content key; and
   an identifier of the authorization key;
   wherein the key links for each of the plurality of distribution targets are combined to form key binding data bounded by the digital content;
   an acquisition engine obtaining the encrypted digital content;
   an analysis engine performing:
   matching the authorization key of the distribution target to the identifier in the key link of the key binding data attached to the encrypted digital content; and
   obtaining the content key using the authorization key; and
   a decryption engine decrypting the encrypted digital content with the content key.

* * * * *